2 Sheets—Sheet 1.

A. B. STANBERRIE.
MACHINE FOR SEPARATING SUBSTANCES OF DIFFERENT SPECIFIC GRAVITY.

No. 170,312. Patented Nov. 23, 1875.

Witnesses
Chas H Smith
Gerald Serrell

Inventor
A. B. Stanberrie
per Lemuel W. Serrell
atty.

N. PETERS, PHOTO-LITHOGRAPHER, WASHINGTON, D. C.

2 Sheets—Sheet 2.

A. B. STANBERRIE.
MACHINE FOR SEPARATING SUBSTANCES OF DIFFERENT SPECIFIC GRAVITY.

No. 170,312. Patented Nov. 23, 1875.

Witnesses
Chas H. Smith
Harold Serrell

Inventor
A. B. Stanberrie
per Lemuel W. Serrell
Atty.

UNITED STATES PATENT OFFICE.

ALBERT B. STANBERRIE, OF PHILADELPHIA, PENNSYLVANIA.

IMPROVEMENT IN MACHINES FOR SEPARATING SUBSTANCES OF DIFFERENT SPECIFIC GRAVITY.

Specification forming part of Letters Patent No. 170,312, dated November 23, 1875; application filed February 24, 1875.

*To all whom it may concern:*

Be it known that I, ALBERT B. STANBERRIE, of Philadelphia, Pennsylvania, have invented an Improvement in Machines for Separating Substances of Different Specific Gravity; and the following is a specification of the same.

In this machine the substances to be separated are fed to a screen immersed in water, which screen has a reciprocating horizontal motion, and by a peculiar construction of the surface upon which the materials lie the materials are lifted and agitated to cause the heavier portions to sink to the bottom, and the lighter to work up by the action of the water, which water is injected through inclined openings, so as to propel the materials toward the point of delivery. The heavy substances pass out at the bottom, and the light materials run over the top, and a wheel-elevator is employed with internal and external buckets. The light material passes into the internal buckets, and the heavy into the external buckets, and these materials are delivered by separate chutes.

The accompanying drawing represents a machine adapted to the separation of slate and coal.

Figure 2:
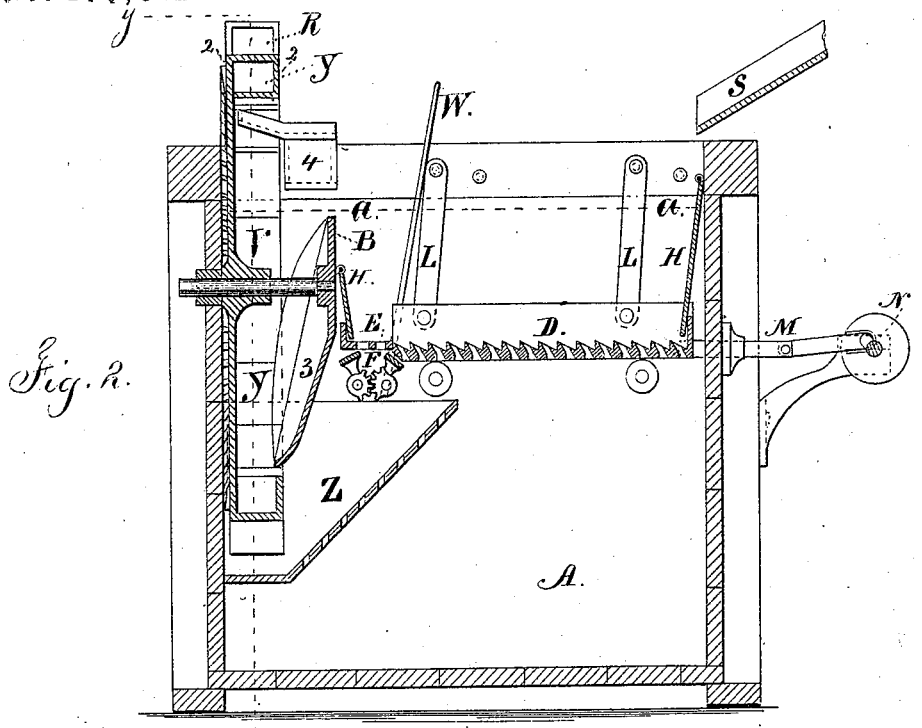
Figure 1:
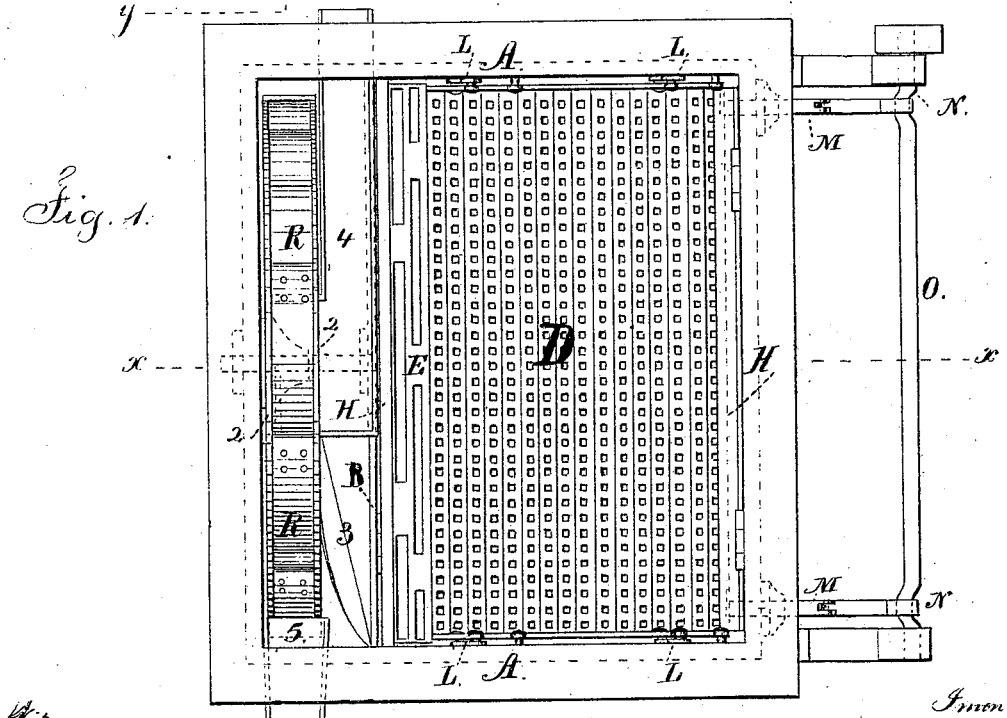
Figure 3:
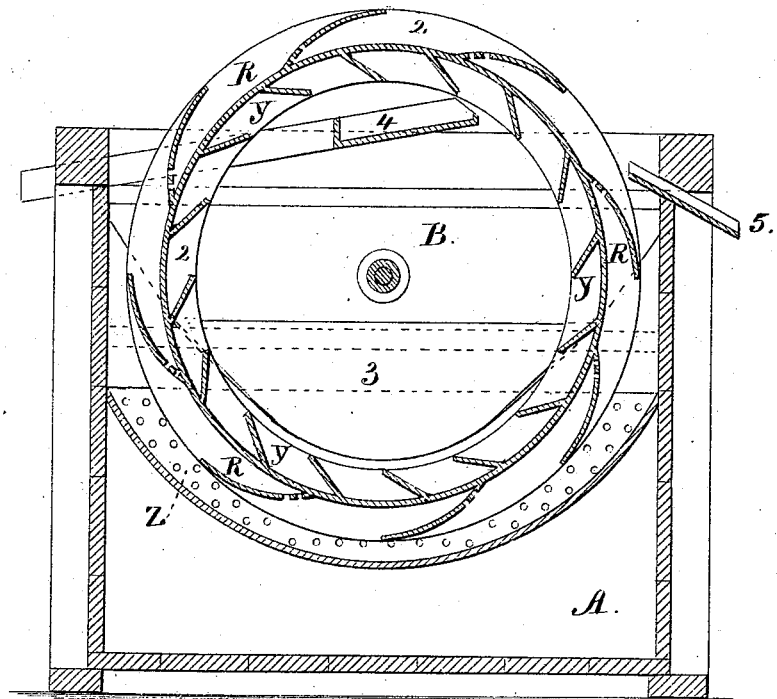

Figure 1 is a plan; Fig. 2 is a vertical section at the line $x\ x$; and Fig. 3 is a section at the line $y\ y$.

Figure 4:
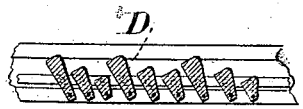

A is a tank filled with water to about the dotted line $a\ a$, and having a transverse partition, B. Near the top of the tank A the screen D is suspended horizontally. The perforations in the screen are of a size to admit free circulation of the water but retain the materials, and the screen extends from side to side of the tank. The screen A may be suspended by the links L, so as to give a rising-and-falling motion to the screen as it is oscillated, or a simple horizontal motion may be obtained by placing the screen upon adjustable rollers at the side of the tank, upon which the end pieces of the screen rest. The surface of the screen is formed with numerous inclines that all stand in one direction, and act to raise or lighten up the materials to be separated as the screen moves back and forth, and the water is caused to circulate through the mass by the holes or openings standing at an inclination, so that the water is caught by the lower portion of the screen-bottom near the opening, and directed up through the same, to act upon the material within the screen to both lighten up the materials, so that a separation may take place according to gravity as the substances subside, and also to carry such materials toward the places of delivery. The jig-bottom may either be formed of stationary metal bars with the openings through them, as seen in the section, Fig. 2, or else such bottom may be made of bars hinged like a Venetian blind, as in Fig. 4, so as to adjust the opening and the force of water by varying the angle of such bars to the plane of the jig-bottom. Motion is imparted to the screen by the connecting-rods M, which are jointed, and pass through stuffing-boxes in the side of the tank A to the cranks N on the shaft O. The coal is fed to the screen by the chute S, and as the slate is the heaviest, it gradually passes down and accumulates at the bottom, and escapes through slots or openings E at the forward end of the screen, and falls upon the inclined plane Z, and runs into the elevator. The escape of the slate through the openings E is regulated by the valves F below the openings. These valves are preferably formed as segments of a cylinder, and they are connected together by segmental gears, and moved by means of the lever W extending above the water-line, and held in position, when adjusted, by a spring. It is preferable that these valves be placed so that one opens slightly in advance of the other. In front of the screen, and near the level of the water, a fixed partition, B, extends from side to side of the tank, over which the coal escapes to the incline leading to the elevator, and there are hinged flaps H that connect the parts and allow of the motion, but prevent the coal escaping at any place except above the partition. The elevator is made of the wheel V, with external buckets R and guide-flanges 2 and internal buckets Y, and the wheel is upon a central shaft, and propelled by competent power applied by a cog-wheel or equivalent device.

The coal runs by the incline 3 into the inside of the wheel, and is raised by the buckets Y and delivered upon the trough 4, and the slate or heavy materials are raised by the external buckets R and delivered upon the chute 5.

I claim as my invention—

1. A sieve-bottom for a jig made with inclines between the ranges of openings, and with openings inclined toward the delivery side of the machine, whereby both the inclines and the jets of water through the openings aid in moving the material to be separated across the jig, substantially as set forth.

2. The horizontally-reciprocating separator made with a sieve-bottom containing ranges of inclines and openings E, for the delivery of the heavier particles, in combination with an adjustable slide or valve to regulate the width of opening, substantially as set forth.

3. The elevating-wheel having internal and external buckets, in combination with the delivery-chutes 4 5 and the inclines Z 3, passing from the separating apparatus, as set forth.

Signed by me this 16th day of February, A. D. 1875.

A. B. STANBERRIE, M. D.

Witnesses:
  GEO. T. PINCKNEY,
  CHAS. H. SMITH.